(12) United States Patent
Nishimura

(10) Patent No.: US 6,409,356 B1
(45) Date of Patent: Jun. 25, 2002

(54) LIQUID CRYSTAL DISPLAY HAVING LIGHT-TRANSMITTING MEMBER IN FRONT OF LIGHT-GENERATING SECTION

(75) Inventor: Mitsuhisa Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/333,885

(22) Filed: Jun. 15, 1999

(30) Foreign Application Priority Data

Jul. 1, 1998 (JP) ............................................ 10-186115

(51) Int. Cl.[7] ................................................ F21V 5/00
(52) U.S. Cl. ......................... 362/31; 362/223; 362/308
(58) Field of Search .......................... 362/31, 318, 23, 362/26, 390, 222, 311, 223, 308; 349/62

(56) References Cited

U.S. PATENT DOCUMENTS

| 4,737,896 A | 4/1988 | Mochizuki et al. |
| 4,798,448 A | 1/1989 | van Raalte |
| 5,040,878 A | 8/1991 | Eichenlaub |
| 5,046,829 A | 9/1991 | Worp |
| 5,050,946 A | 9/1991 | Hathaway et al. |
| 5,202,950 A | 4/1993 | Arego et al. |
| 5,339,179 A | 8/1994 | Rudisill et al. |
| 5,420,710 A | 5/1995 | Nanbu |
| 5,461,547 A | * 10/1995 | Ciupke et al. ............... 362/390 |
| 5,558,420 A | * 9/1996 | Oki et al. ...................... 362/31 |
| 5,666,172 A | 9/1997 | Ida et al. |
| 5,712,694 A | * 1/1998 | Taira et al. .................... 349/62 |

FOREIGN PATENT DOCUMENTS

| JP | 61-186162 | 11/1986 |
| JP | 3-71592 | 3/1991 |
| JP | 3-80415 | 8/1991 |
| JP | 4-32819 | 2/1992 |
| JP | 4-47658 | 2/1992 |
| JP | 6-36036 | 5/1994 |
| JP | 6-148434 | 5/1994 |
| JP | 7-218729 | 8/1995 |
| JP | 8-194222 | 7/1996 |
| JP | 9-259625 | 10/1997 |

* cited by examiner

Primary Examiner—Thomas M. Sember
(74) Attorney, Agent, or Firm—Young & Thompson

(57) ABSTRACT

An LCD is provided, by which damage to an irradiating tube can be prevented, and the unevenness of light in a display section can be reduced. In the LCD, the display section and the light-generating section are detachably attached to each other. Elastic members for supporting the irradiating tube are provided in the light-generating section in a tightly contacting manner, and a light-transmitting member for transmitting the light from the irradiating tube is positioned at the light-emitting side of the light-generating section.

6 Claims, 4 Drawing Sheets

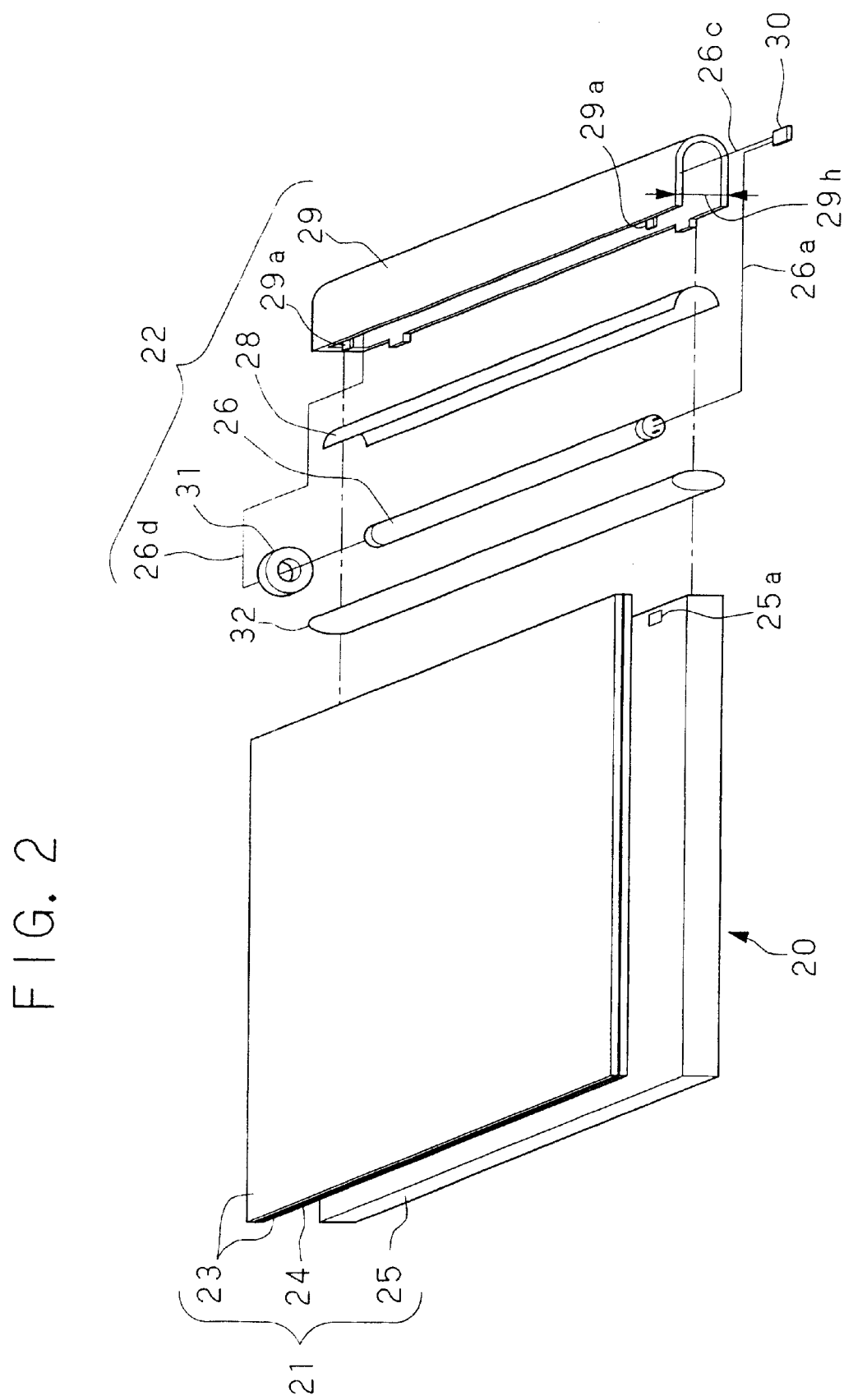

LIQUID CRYSTAL DISPLAY HAVING LIGHT-TRANSMITTING MEMBER IN FRONT OF LIGHT-GENERATING SECTION

BACKGROUND OF THE INVENTION

1. Field of the Invention

The present invention relates to an LCD (liquid crystal display) used for a computer, television, or the like.

This application is based on Patent Application No. Hei 10-186115 filed in Japan, the contents of which are incorporated herein by reference.

2. Description of the Related Art

An LCD is a display utilizing the characteristic of the liquid crystal that the molecular arrangement thereof is changed when a voltage is applied to a liquid crystal.

FIG. 4 is a perspective view showing a conventional example of an LCD.

This LCD 10 comprises liquid crystal panel 11 for displaying characters or the like, and backlight 12 for irradiating the liquid crystal panel 11, these components being contained in chassis 9.

In the structure of the liquid crystal panel 11, two transparent glass substrates 13 are made to adhere together, liquid crystal 14 being disposed therebetween. These glass substrates are disposed on a light-introducing plate 15, and the periphery of these substrates and the light-introducing plate are surrounded and anchored by the chassis 9.

In the backlight 12, the both ends of fluorescent lamp 16 are supported by connectors 17, and the lamp is covered via reflection plate 18 with lamp holder 19 which is integrally formed with a side portion of the chassis 9.

In the above structure, when the power switch is turned ON so that the fluorescent lamp 16 is switched on, the light of the fluorescent lamp 16 is reflected by the reflection plate 18 and is introduced into the light-introducing plate 15, and this light passes in turn through the lower-side and upper-side transparent glass substrates 13. In this process, if a specific voltage is applied to the liquid crystal 14, then the molecular arrangement thereof is changed and each area of the liquid crystal 14 is classified into a light-transmitting area or a light-blocking area. Therefore, a portion of the light transmitted through the lower-side transparent glass substrate 13 passes through each light-transmitting area in the liquid crystal 14, and further passes through the upper-side transparent glass substrate 13, while the other portion of the above light is reflected by each light-blocking area in the liquid crystal 14 towards the lower-side transparent glass substrate 13. Accordingly, a predetermined character or a picture can be shown by a combination of light-transmitting and blocking areas, and be displayed in the liquid crystal panel 11.

However, in the conventional LCD 10, the fluorescent lamp 16 is supported only at the both ends thereof by the connectors 17; thus, if a vibration or impact occurs to the backlight 12 during the transport of the LCD 10, the fluorescent lamp 16 may be bent and broken. As there is a space between the lamp holder 19 and the light-introducing plate 15, if the fluorescent lamp 16 is broken, then broken pieces or mercury may be scattered towards the light-introducing plate 15 side and the liquid crystal panel 11 may be contaminated.

Additionally, when the broken fluorescent lamp 16 is replaced, the LCD itself must be dismantled, and thus it is troublesome.

On the other hand, the light of fluorescent lamp 16 reflected by the reflection plate 18 concentrates at the area near the light-introducing portion (at the fluorescent lamp 16 side) of the light-introducing plate 15. Therefore, such non-uniform light causes uneven brightness in the liquid crystal panel 11.

SUMMARY OF THE INVENTION

In consideration of the above problems, an objective of the present invention is to provide an LCD for which damage to an irradiating tube can be prevented, and the unevenness of light in a display section can be reduced.

Therefore, the present invention provides a liquid crystal display comprising a display section using liquid crystal, and a light-generating section having an irradiating tube for irradiating the display section, further comprising:

fitting means for detachably attaching the light-generating section to the display section;

one or more elastic members, provided in the light-generating section in a tightly contacting manner, for supporting the irradiating tube; and a light-transmitting member, positioned at the light-emitting side of the light-generating section, for transmitting the light from the irradiating tube.

According to the above structure, the irradiating tube is supported by the elastic members; thus, if a vibration or impact occurs to the light-generating section, such a vibration or impact is absorbed by the elastic members and is not directly transmitted to the irradiating tube. Therefore, the irradiating tube is not bent, and thus it is possible to prevent the irradiating tube from being broken. In addition, the light-transmitting member is positioned at the light-emitting side of the light-generating section; thus, the light from the irradiating tube is not concentrated near the border area between the light-generating section and the display section, and thus the display section is uniformly irradiated. Accordingly, uneven brightness on the display section can be reduced.

BRIEF DESCRIPTION OF THE DRAWINGS

FIG. 2 is a perspective view showing the dismantled state of the LCD of FIG. 1.

DESCRIPTION OF THE PREFERRED EMBODIMENTS

Hereinafter, an embodiment of the LCD according to the present invention will be explained with reference to the drawings.

Figure 1:
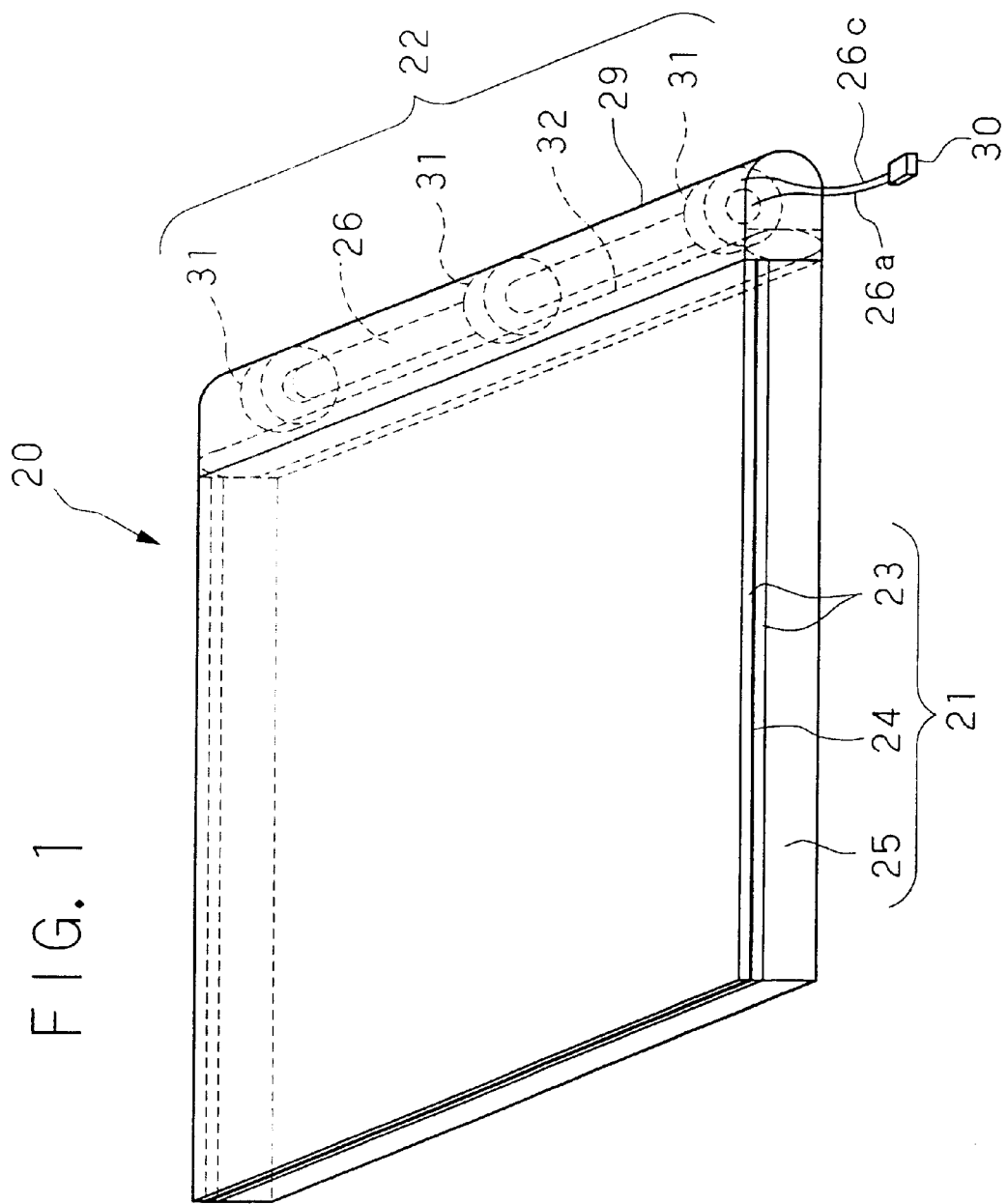
FIG. 1 is a perspective view of the LCD of an embodiment according to the present invention.
Figure 4:
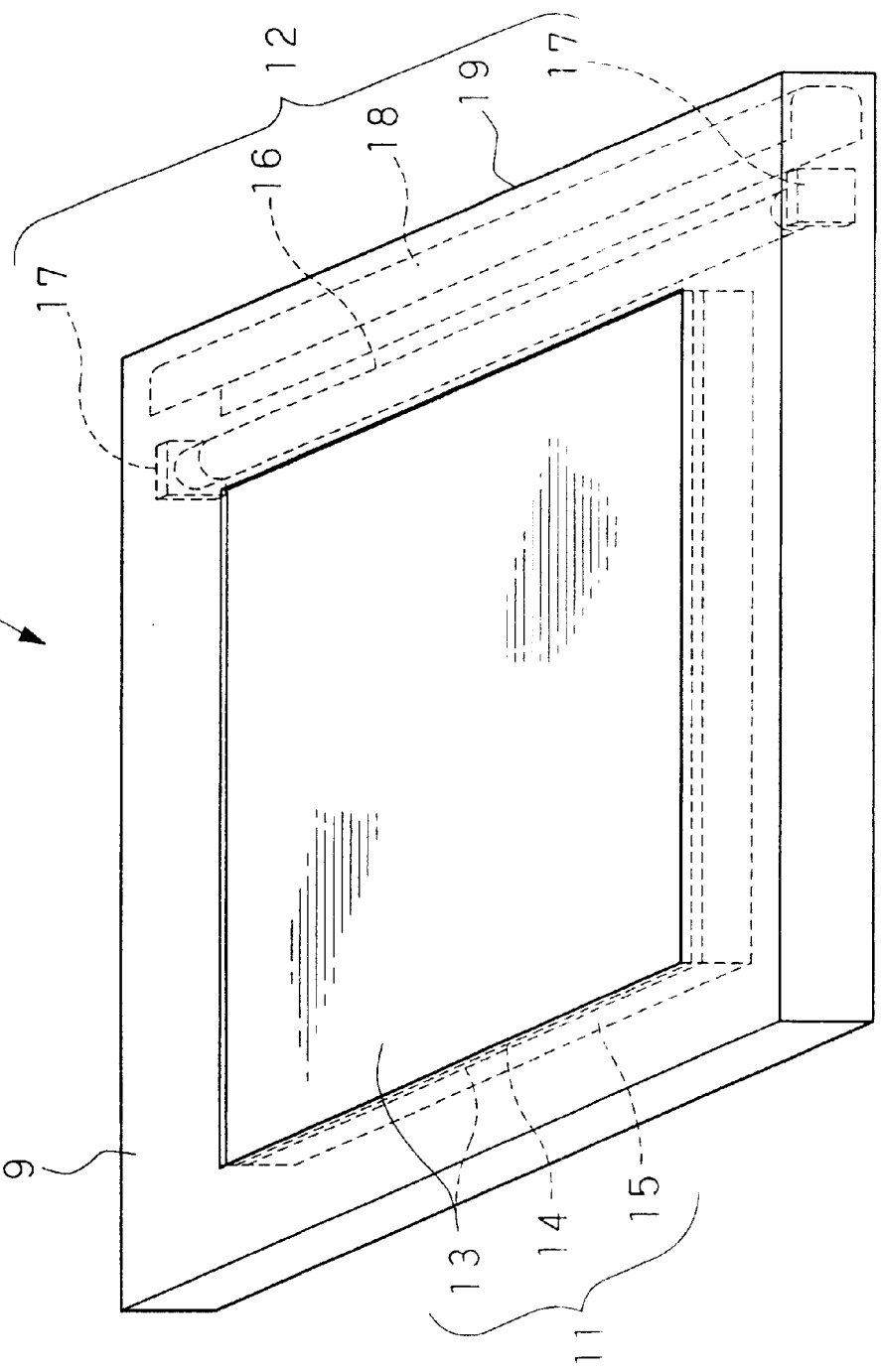
FIG. 4 is a perspective view showing a conventional example of an LCD.

FIG. 1 is a perspective view of the LCD of the present embodiment, and FIG. 2 is a perspective view showing the dismantled state of the LCD. In these figures, chassis 9 as shown in FIG. 4 is omitted for convenience of the explanation.

This LCD 20 comprises a liquid crystal panel (corresponding to the display section of the present invention) 21 for displaying characters or the like, and a backlight (corresponding to the light-generating section of the present invention) 22 for irradiating the liquid crystal panel 21, these components being detachable from each other.

In the structure of the liquid crystal panel 21, two transparent glass substrates 23 are made to adhere together, liquid crystal 24 being disposed therebetween. These glass substrates are disposed on a light-introducing plate 25, and the periphery of these substrates and the light-introducing plate are surrounded and anchored by the chassis (not shown). The following are examples of the liquid crystal panel 21: the TN (Twisted Nematic) type liquid crystal panel which comprises liquid crystal cells in which nematic liquid crystals twisted by 90 degrees are arranged, and the STN (Super-Twisted Nematic) type liquid crystal panel which comprises liquid crystal cells in which nematic liquid crystals twisted by 180 degrees are arranged.

In the backlight 22, both ends and the central portion of fluorescent lamp (corresponding to the irradiating tube of the present invention) 26 are supported by lamp supporters (corresponding to the elastic members of the present invention) 31, and the lamp is covered, via reflection plate 28 and shield plate (corresponding to the light-transmitting member of the present invention) 32, with lamp holder 29 made of an electrically conductive material.

The backlight 22 is attached to the liquid crystal panel 21 in a manner such that the light-emitting side, that is, the shield plate 32 side faces the light-introducing portion of the light-introducing plate 25, and that convex fitting portions (corresponding to the fitting means of the present invention) 29a, integrally provided with lamp holder 29, are engaged with concave fitting portions (corresponding to the fitting means of the present invention) 25a provided in the light-introducing plate 25.

The lamp supporters 31 are made of an elastic material such as a silicon gum and are shaped as a disk. The outer diameter of each lamp supporter 31 is substantially the same as the height of the lamp holder 29 (refer to reference numeral 29h in FIG. 2), and the inner diameter of each lamp supporter 31 is a little smaller than the diameter of the fluorescent lamp 26.

The shield plate 32 is made of a transparent resin such as an acrylic resin (polymethyl methacrylate) and is shaped as an elliptic cylinder. The longer diameter (corresponding to the major axis of the ellipse) of the shield plate 32 is substantially the same as the height (29h) of the lamp holder 29, and the length of the shield plate 32 is substantially the same as the length of the lamp holder 29.

In the above structure, when the power switch is turned ON so that the fluorescent lamp 26 is switched on, the light of the lamp 26 is reflected by the reflection plate 28 and is incident on the shield plate 32. The incident light is refracted (or dispersed) and passes through the opening of the backlight and the light-introducing portion of the light-introducing plate 25 so that the light is uniformly introduced into the light-introducing plate 25. The introduced light is transmitted in turn through the lower-side transparent glass substrate 23 and the upper-side transparent glass substrate 23. When a predetermined voltage is applied to target areas of the liquid crystal 24, the molecular arrangement of the liquid crystal 24 is changed so that each area of the liquid crystal 14 is classified into a light-transmitting area or a light-blocking area. Accordingly, a portion of the light transmitted through the lower-side transparent glass substrate 23 passes through each light-transmitting area in the liquid crystal 24 and further passes through the upper-side transparent glass substrate 23, while the other portion of the above light is reflected by each light-blocking area in the liquid crystal 24 towards the lower-side transparent glass substrate 23. Accordingly, a predetermined character or a picture can be shown by a combination of light-transmitting and blocking areas, and be displayed in the liquid crystal panel 21.

Figures 3A, 3B:
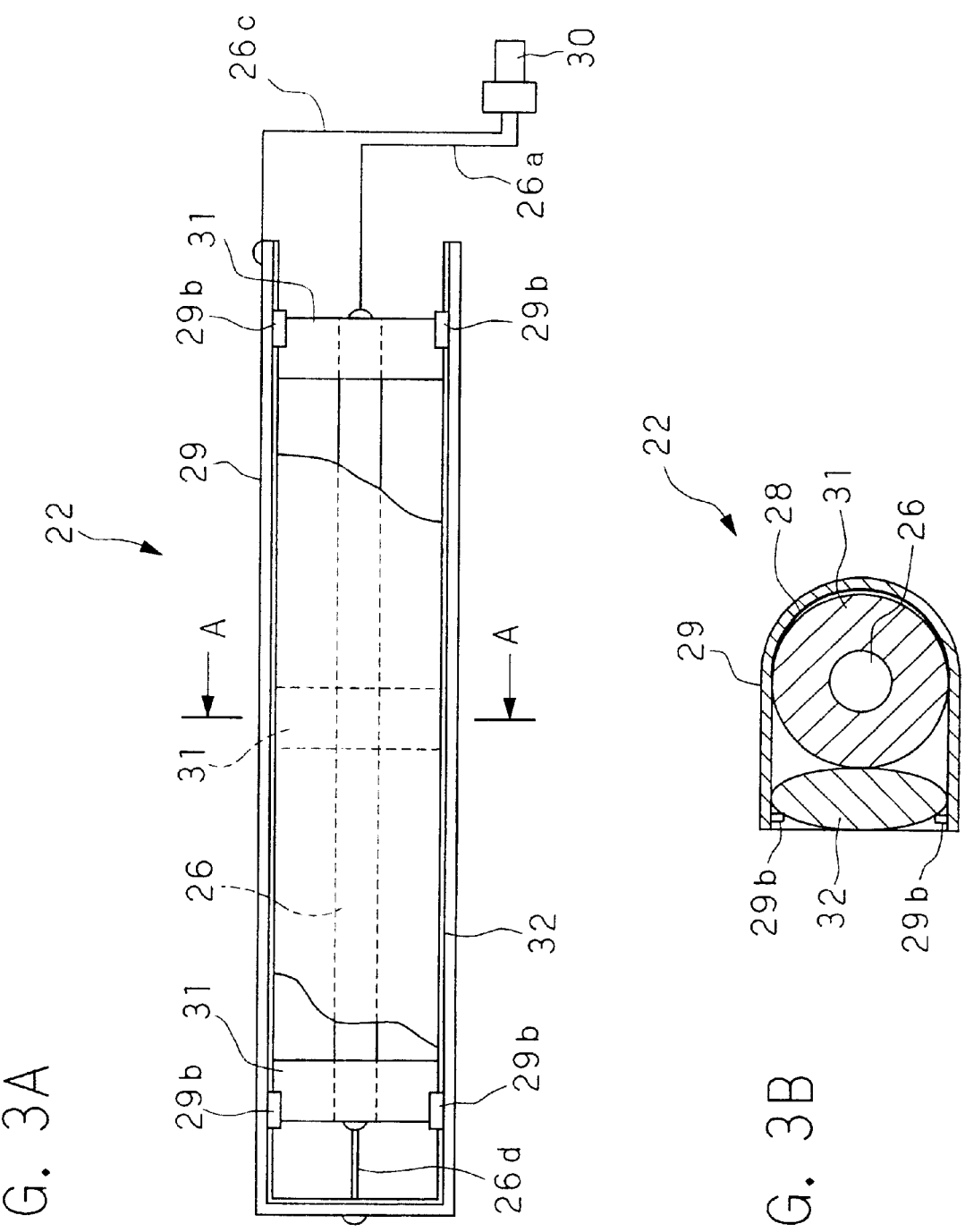
FIG. 3A is a side view observed from the light-emitting side of the assembled backlight 22.
FIG. 3B is a sectional side view along the line A—A in FIG. 3A.

Hereinafter, the assembling process of the backlight 22 will be explained. Here, FIG. 3A is a side view observed from the light-emitting side of the assembled backlight 22, and FIG. 3B is a sectional side view along the line A—A in FIG. 3A.

First, the fluorescent lamp 26 is inserted into (the inner-peripheral side of) one of the lamp supporters 31, and the lamp supporter 31 is positioned at approximately the center of the fluorescent lamp 26. As the lamp supporter 31 is elastically deformed by the fluorescent lamp 26 and thus is expanded, the lamp supporter 31 is fixed at approximately the center of the fluorescent lamp 26 by the pressure on the surface of the fluorescent lamp 26 from the inner surface of the lamp supporter 31, and the friction between the inner surface of the lamp supporter 31 and the surface of the fluorescent lamp 26. The remaining lamp supporters 31 are fixed at both sides of the fluorescent lamp 26 in a similar manner.

Next, lead 26d is connected to the lower-voltage side of the fluorescent lamp 26, and this lead 26d is also connected to the lamp holder 29. In contrast, lead 26a is connected to the higher-voltage side of the fluorescent lamp 26, and this lead 26a is also connected to the connector 30 which is connected via lead 26c with the lamp holder 29. Therefore, the lead 26d connected to the lower-voltage side is connected via the lamp holder 29 with the connector.

Then, the reflection plate 28 is inserted into the lamp holder 29, and the fluorescent lamp 26 with the lamp supporters 31 is also inserted into the lamp holder 29. In this process, the outer-peripheral surface of each lamp supporter 31 is made to tightly contact the inner-peripheral surface of the lamp holder 29. As the lamp supporters 31 are elastically deformed and pressed, the fluorescent lamp 26 with the lamp supporters 31 is fixed inside the lamp holder 29 by the pressure on the inner-peripheral surface of the lamp holder 29 from the outer-peripheral surface of each lamp supporter 31, and the friction between the inner surface of each lamp supporter 31 and the inner-peripheral surface of the lamp holder 29.

Next, the shield plate 32 is inserted into the lamp holder 29, and both sides of the shield plate 32 are fit at projecting portions 29b, and simultaneously, the outer-peripheral surface of the shield plate 32 is made to tightly contact the outer-peripheral surface of each lamp supporter 31. In this way, the lamp supporters 31 are further elastically deformed and pressed so that the fluorescent lamp 26 with the lamp supporters 31 is perfectly fixed inside the lamp holder 29.

According to the above assembling process, the fluorescent lamp 26 is disposed via the lamp supporters 31 between the lamp holder 29 and the shield plate 32, which is fixed at the opening of the lamp holder 29. Therefore, if a vibration or impact occurs to the backlight 22 during the transport of the LCD 20, such a vibration or impact is absorbed by the lamp supporters 31 and is not directly transmitted to the fluorescent lamp 26. Accordingly, the fluorescent lamp 26 is not bent, and thus it is possible to prevent the fluorescent lamp 26 from being broken.

Even if the fluorescent lamp 26 is broken, the shield plate 32 is put between the opening of the lamp holder 29 and the light-introducing portion of the light-introducing plate 25; thus, broken pieces or mercury remains inside the lamp holder 29, and is not scattered towards the light-introducing plate 25 side. Therefore, contamination of the liquid crystal panel 21 caused by scattered broken pieces or mercury of the fluorescent lamp 26 can be prevented.

In addition, the backlight 22 can be easily attached to or detached from the liquid crystal panel 21 simply by abutting or pulling back the backlight; thus, the operation of changing the fluorescent lamp 26 is easier, and the safety of the operation can be improved.

Furthermore, the light of the fluorescent lamp 26 reflected by the reflection plate 28 is incident on the shield plate 32 and is refracted so that the light-introducing plate 25 is irradiated. Therefore, light concentration near the engagement portion of the lamp holder 29 and the light-introducing plate 25 does not occur, and thus non-uniform radiation can be prevented. That is, the light is uniformly radiated towards the light-introducing plate 25; thus, uneven brightness on the liquid crystal panel 21 can be reduced.

In the above explained embodiment, the lamp supporters 31 are shaped as a disk; however, the shape thereof is not limited and any shape by which the fluorescent lamp 26 can be held and fixed is possible. For example, a rectangular parallelopiped shape is possible. Additionally, in the above embodiment, the both ends and the central portion of the fluorescent lamp 26 are supported by lamp supporters 31; however, the supporting positions are not limited. For example, a plurality of supporting points may be provided along the longitudinal direction of the fluorescent lamp 26.

Also in the above embodiment, the shield plate 32 is shaped as an elliptic cylinder; however, the shape thereof is not limited and any shape for shielding the opening of the lamp holder 29 from the light-introducing portion of the light-introducing plate 25 is possible. For example, a square pole or a semicylinder.

Furthermore, an LCD comprising only one of (i) the lamp supporters 31 and (ii) the shield plate 32 is also possible.

What is claimed is:

1. A liquid crystal display comprising:

a liquid crystal display section;

a light generating section having an irradiating tube for irradiating said display section;

fittings on said display section and on said light-generating section for detachably attaching said light-generating section to said display section;

at least one elastic member provided in said light-generating section, surrounding and supporting said irradiating tube;

a reflecting plate, positioned in the light-generating section and at an opposite side of a light-emitting side of the light-generating section, for reflecting light from the irradiating tube; and a light-transmitting member, positioned at the light-emitting side of the light-generating section, for refracting and transmitting the light reflected by the reflecting plate, the light-transmitting member having a shape in which the display section is substantially uniformly irradiated by transmitted light through the light-transmitting member.

2. The liquid crystal display as claimed in claim 1, comprising more than one said elastic member, both ends and a central portion of said irradiating tube are supported by said elastic members.

3. The liquid crystal display as claimed in claim 2, wherein said light-transmitting member contacts said elastic members.

4. The liquid crystal display as claimed in claim 3, wherein a cross-section of said light-transmitting member is convex.

5. The liquid crystal display as claimed in claim 1, wherein said light-transmitting member contacts said at least one elastic member.

6. The liquid crystal display as claimed in claim 1, wherein a cross-section of said light-transmitting member is generally elliptical.

* * * * *